United States Patent
Seo

(10) Patent No.: US 10,764,902 B2
(45) Date of Patent: Sep. 1, 2020

(54) DIRECT COMMUNICATION METHOD BETWEEN TERMINALS IN WIRELESS COMMUNICATION SYSTEM, AND APPARATUS THEREFOR

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/758,719

(22) PCT Filed: Sep. 12, 2016

(86) PCT No.: PCT/KR2016/010256
§ 371 (c)(1),
(2) Date: Mar. 8, 2018

(87) PCT Pub. No.: WO2017/048009
PCT Pub. Date: Mar. 23, 2017

(65) Prior Publication Data
US 2018/0249470 A1 Aug. 30, 2018

Related U.S. Application Data

(60) Provisional application No. 62/344,382, filed on Jun. 1, 2016, provisional application No. 62/340,473, filed
(Continued)

(51) Int. Cl.
*H04W 74/08* (2009.01)
*H04W 72/04* (2009.01)
(Continued)

(52) U.S. Cl.
CPC ... *H04W 72/0493* (2013.01); *H04W 74/0808* (2013.01); *H04W 28/26* (2013.01); *H04W 92/18* (2013.01)

(58) Field of Classification Search
CPC ............ H04W 72/0493; H04W 92/18
See application file for complete search history.

(56) References Cited

U.S. PATENT DOCUMENTS

2014/0044036 A1* 2/2014 Kim ............... H04W 72/0446
370/315
2014/0324974 A1* 10/2014 Park ................ H04W 72/02
709/204

(Continued)

FOREIGN PATENT DOCUMENTS

KR   1020140058644   5/2014
WO      2015021185   2/2015

OTHER PUBLICATIONS

Ericsson, "Handling collisions between communication and discovery resources," 3GPP TSG-RAN WG1 #82, R1-154438, Aug. 2015, 3 pages.

(Continued)

*Primary Examiner* — Lakeram Jangbahadur
(74) *Attorney, Agent, or Firm* — Lee Hong Degerman Kang Waimey

(57) ABSTRACT

A method for performing, by a first terminal, D2D communication in a wireless communication system, according to an embodiment of the present invention, the method comprising: receiving, from a second terminal, control information including information on future resources of the second terminal allocated to be used for transmission of the second terminal; and performing D2D transmission in consideration of the future resources of the second terminal, wherein the first terminal does not perform the D2D transmission in a
(Continued)

resource in which a receipt power of the future resources of the second terminal is greater than a specific threshold.

10 Claims, 10 Drawing Sheets

Related U.S. Application Data on May 23, 2016, provisional application No. 62/326,014, filed on Apr. 22, 2016, provisional application No. 62/219,092, filed on Sep. 15, 2015.

(51) Int. Cl.
*H04W 28/26* (2009.01)
*H04W 92/18* (2009.01)

(56) References Cited

U.S. PATENT DOCUMENTS

2015/0092656 A1   4/2015  Lindh et al.
2017/0303217 A1*  10/2017  Lee .......................... H04J 11/00

OTHER PUBLICATIONS

PCT International Application No. PCT/KR2016/010256, Written Opinion of the International Searching Authority dated Dec. 22, 2016, 10 pages.
European Patent Office Application Serial No. 16846830.4, Search Report dated Apr. 17, 2019, 5 pages.

* cited by examiner (a) control plane protocol stack (b) user plane protocol stack (a)

(b)

DIRECT COMMUNICATION METHOD BETWEEN TERMINALS IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/010256, filed on Sep. 12, 2016, which claims the benefit of U.S. Provisional Application No. 62/219,092, filed on Sep. 15, 2015, 62/326,014, filed on Apr. 22, 2016, 62/340,473, filed on May 23, 2016, and 62/344,382, filed on Jun. 1, 2016, the contents of which are all hereby incorporated by reference herein in their entirety.

TECHNICAL FIELD

The present invention relates to a wireless communication system, and more particularly, to a method of performing direct communication between terminals in a wireless communication system and an apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

A technical task of the present invention is to provide a method of performing direct communication between terminals in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing D2D (device-to-device) communication, which is performed by a first UE in a wireless communication system, includes the steps of receiving control information including information on future resources, which are allocated to be used for transmission of a second UE, from the second UE, and performing D2D transmission in consideration of the future resources of the second UE. In this case, the first UE may not perform the D2D transmission in a resource of which reception power is greater than a specific threshold among the future resources of the second UE.

The method can further include the step of receiving information on the specific threshold from a base station.

Additionally or alternatively, the control information further includes information on a priority of a data to be transmitted by the second UE and the specific threshold can be determined based on the priority of the data to be transmitted by the second UE and a priority of a data to be transmitted by the first UE.

The specific threshold can be determined based on the number of resources usable for the D2D transmission. For example, if the number of resources usable for the D2D transmission is less than a specific value, the specific threshold can be determined to have a bigger value.

Meanwhile, reception power of the future resources of the second UE may have a value directly measured from the future resources of the second UE or a value anticipated from reception power of the control information. And, the reception power of the future resources of the second UE may correspond to reception power of all future resources of the second UE or reception power of a DM-RS among the future resources of the second UE.

Additionally or alternatively, if the number of resources usable for the D2D transmission is less than a specific value, although the future resources of the second UE are collided with a resource to be used for the D2D transmission, the D2D transmission can be performed.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to the present invention, since a specific terminal performs an operation of avoiding a resource collision between a resource for performing D2D transmission and a future resource of a different terminal in consideration of reception power of the future resource, a priority of a transmission data, and the like, it is able to reduce an unnecessary resource collision, thereby increasing resource utilization in D2D communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
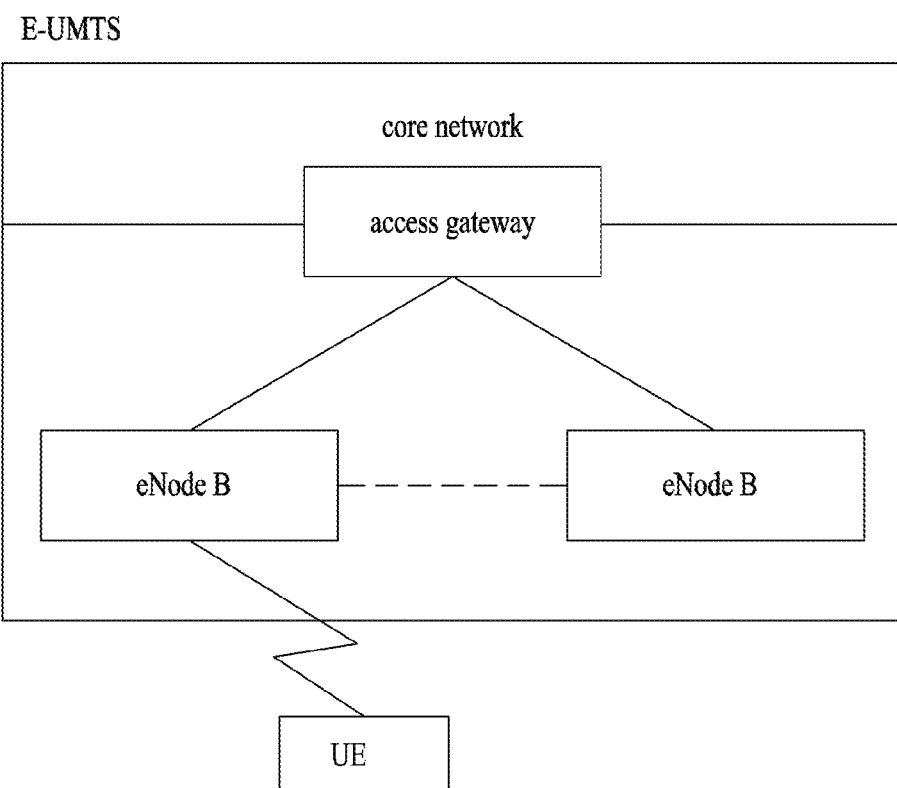
FIG. 1 is a schematic diagram of E-UMTS network structure as one example of a wireless communication system.
Figure 2:
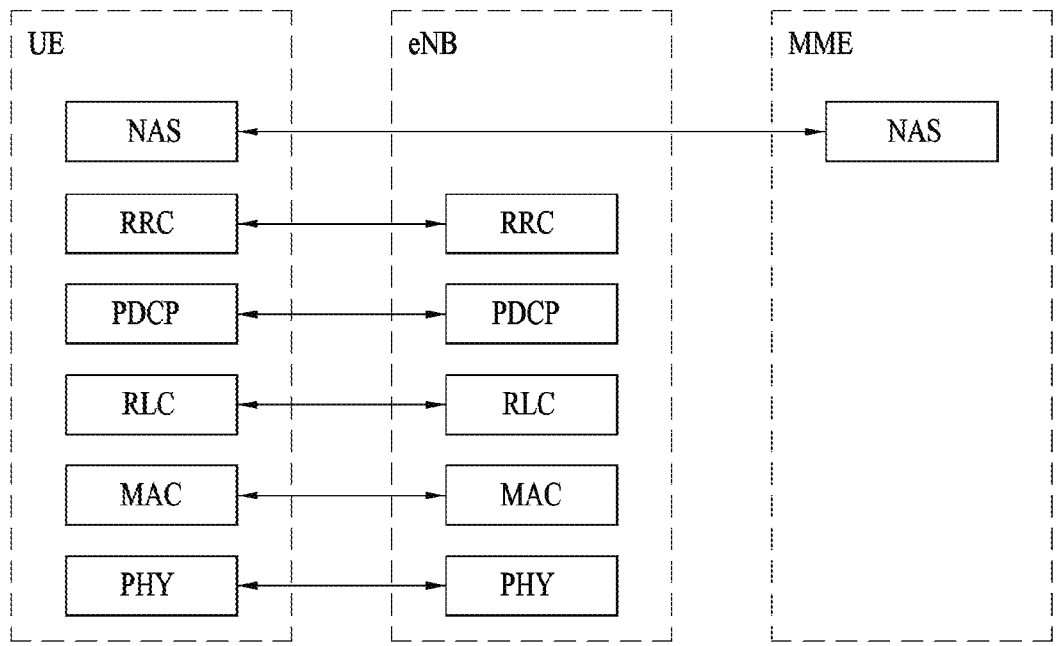
FIG. 2 is a diagram illustrating structures of a control plane and a user plane of a radio interface protocol between a user equipment and E-UTRAN based on the 3GPP radio access network standard.
Figure 2:
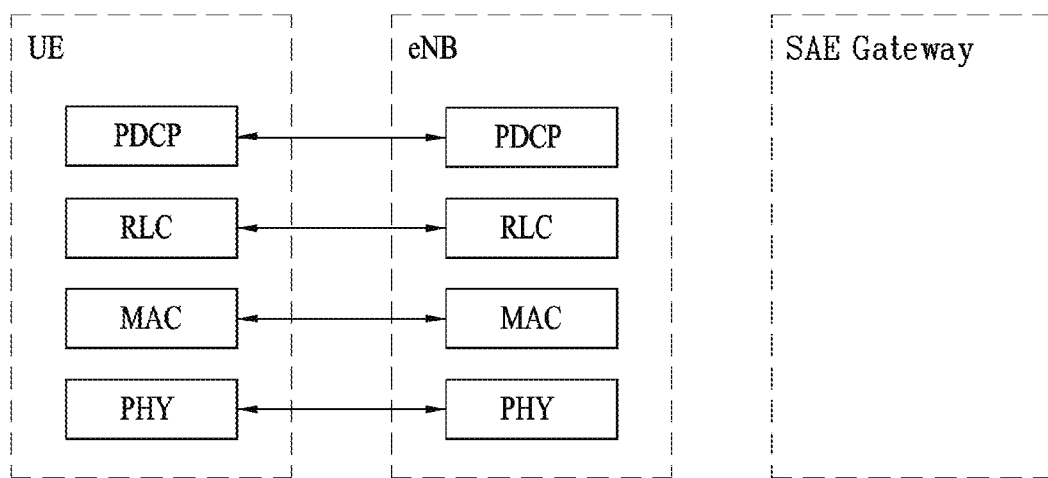

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS)

layer located at a layer higher than the RRC layer performs a function such as session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
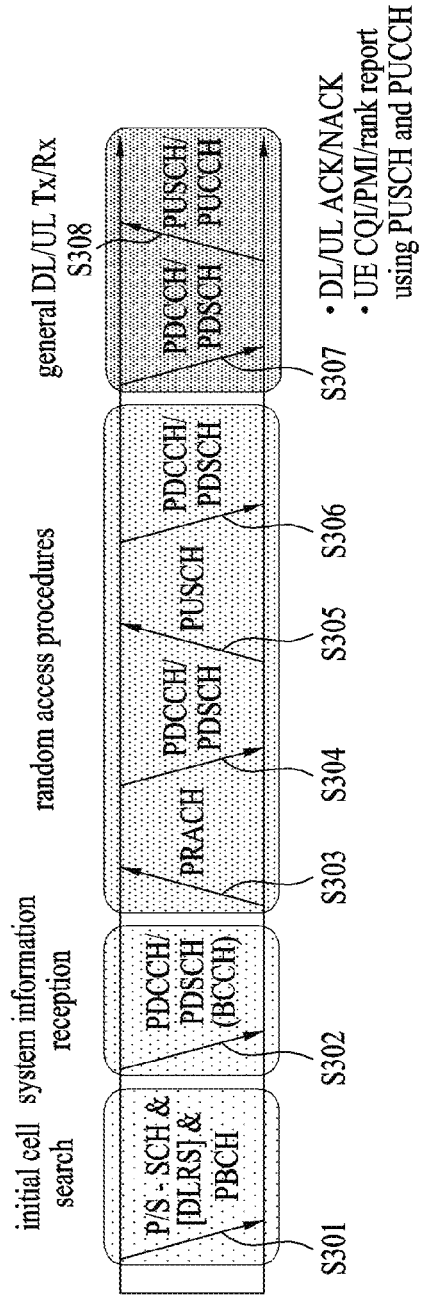
FIG. 3 is a diagram illustrating physical channels used in a 3GPP LTE system and a general method for transmitting a signal using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
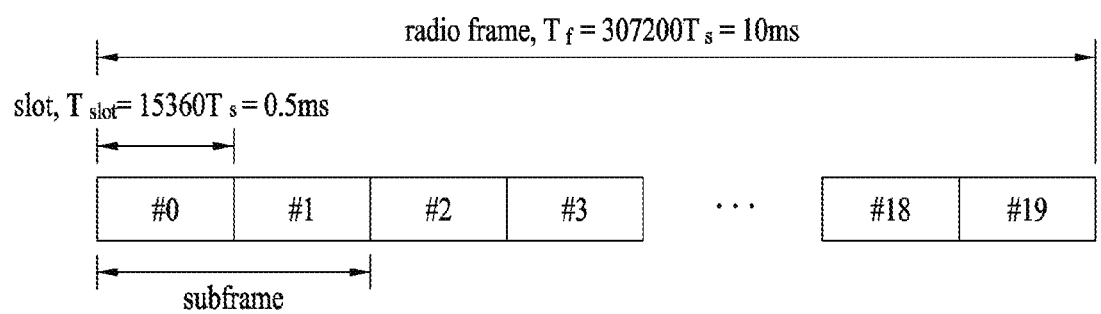
FIG. 4 is a diagram illustrating a structure of a radio frame used in an LTE system.

FIG. 4 is a diagram for a structure of a radio frame in LTE system.

Referring to FIG. 4, one radio frame has a length of 10 ms (327,200×TS) and is constructed with 10 subframes in equal size. Each of the subframes has a length of 1 ms and is constructed with two slots. Each of the slots has a length of 0.5 ms (15,360×TS). In this case, Ts indicates a sampling time and is represented as Ts=1/(15 kHz×2048)=3.2552× 10−8 (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
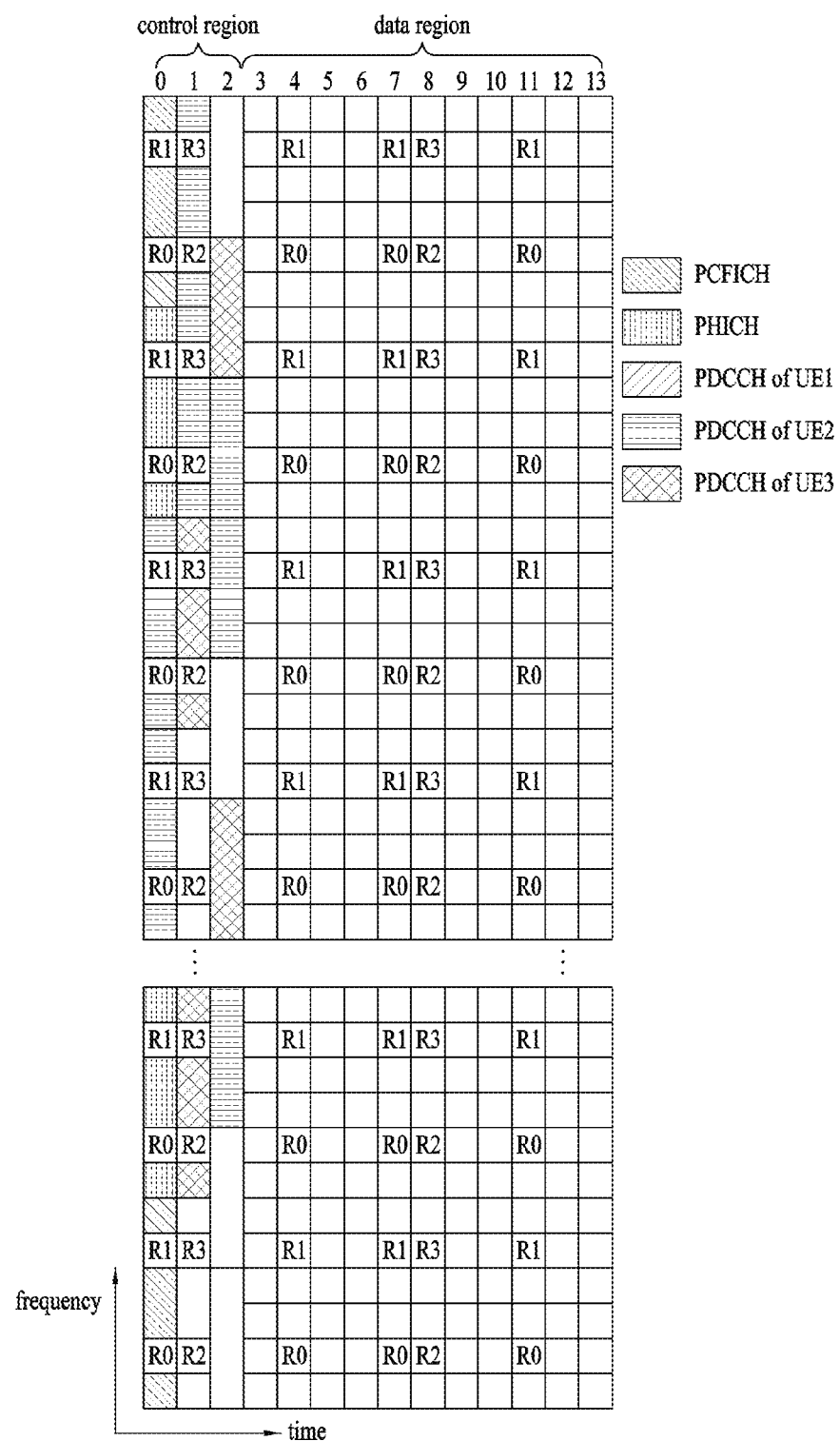
FIG. 5 is a diagram illustrating a control channel included in a control region of a subframe in a downlink radio frame.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
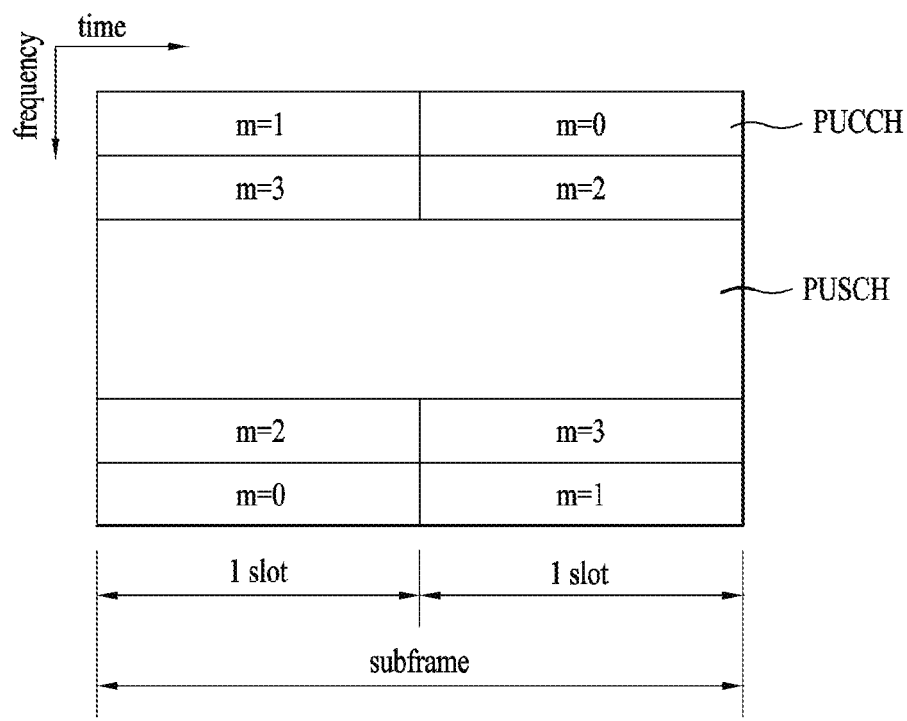
FIG. 6 is a diagram for a structure of an uplink subframe in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following, D2D (device to device) communication is explained.

D2D (device to device) communication literally means communication between an electronic device and an electronic device. In a broad sense, the D2D communication means wired or wireless communication between electronic devices or communication between a device controlled by a human and a machine. Yet, recently, the D2D communication generally indicates wireless communication performed between an electronic device and an electronic device without human involvement.

According to a D2D communication scheme or a UE-to-UE communication scheme, data can be exchanged between UEs without passing through a base station. A link directly established between devices can be referred to as a D2D link or a sidelink. The D2D communication has merits in that latency is reduced compared to a legacy base station-centered communication scheme and a less radio resource is required, and the like. In this case, although a UE corresponds to a terminal of a user, if such a network device as an eNB transmits and receives a signal according to a communication scheme between UEs, the network device can be considered as a sort of UEs. And, the eNB can receive a D2D signal transmitted by the UE. Moreover, a method for a UE designed for D2D transmission to transmit and receive a signal can also be applied to an operation of transmitting data transmitted to an eNB from the UE.

In order to perform D2D communication, it is necessary to obtain time synchronization and frequency synchronization between two UEs. In general, if the two UEs belong to the coverage of an eNB, the two UEs are synchronized by a PSS/SSS, CRS, or the like transmitted by the eNB and the time/frequency synchronization can be maintained between the two UEs in a level that the two UEs are able to directly transmit and receive a signal.

Meanwhile, a D2D transmission signal transmitted through a sidelink can be mainly divided into a discovery use and a communication use. A discovery signal corresponds to a signal used by a UE to determine a plurality of UEs adjacent to the UE. As an example of a sidelink channel for transmitting and receiving the discovery signal, there is a sidelink discovery channel (PSDCH: Physical Sidelink Discovery Channel). A communication signal corresponds to a signal for transmitting general data (e.g., voice, image information, etc.) to be transmitted by a UE. As an example of a sidelink channel for transmitting and receiving the communication signal, there are a physical sidelink broadcast channel (PSBCH), a physical sidelink shared channel (PSSCH), a physical sidelink control channel (PSCCH), and the like.

Figure 7:
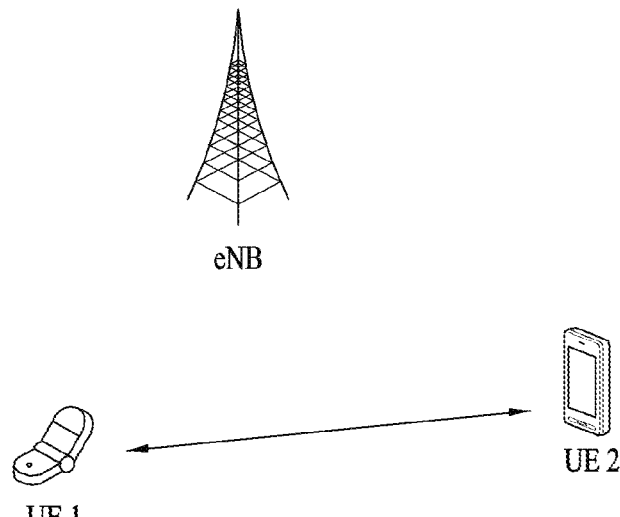
FIG. 7 is a diagram illustrating an example of a UE1 performing D2D communication, a UE2, and a D2D resource pool used by the UE1 and the UE2.
Figure 7:
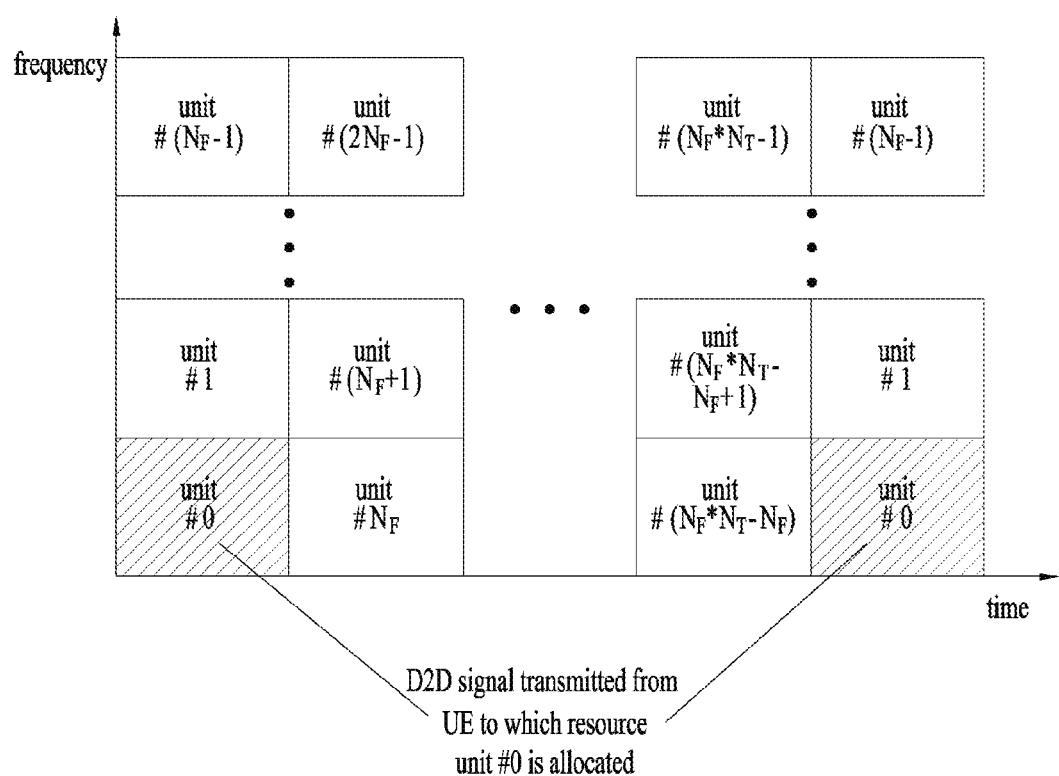

FIG. 7 shows an example of a UE1, a UE2 and a resource pool used by the UE1 and the UE2 performing D2D communication.

In FIG. 7 (a), a UE corresponds to a terminal or such a network device as an eNB transmitting and receiving a signal according to a D2D communication scheme. A transmission UE (UE1) selects a resource unit corresponding to a specific resource from a resource pool corresponding to a set of resources and the UE transmits a D2D signal using the selected resource unit. A reception UE (UE2) receives a configuration of a resource pool in which the UE1 is able to transmit a signal and detects a signal of the UE1 in the resource pool. In this case, if the UE1 is located within a connection range of an eNB, the eNB can inform the UE1 of the resource pool. If the UE1 is located at the outside of the connection range of the eNB, the resource pool can be informed by a different UE or can be determined by a predetermined resource. In general, a resource pool includes a plurality of resource units. A UE selects one or more resource units from the resource pool and may be able to use the selected resource unit(s) for D2D signal transmission.

FIG. 7 (b) shows an example of configuring a resource unit. Referring to FIG. 7 (b), the entire frequency resources are divided into the $N_F$ number of resource units and the entire time resources are divided into the $N_T$ number of resource units. In particular, it is able to define $N_F*N_T$ number of resource units in total. In particular, according to the present embodiment, a resource pool can be repeated with a period of $N_T$ subframes. Specifically, as shown in FIG. 7, one resource unit may periodically and repeatedly appear (e.g., unit #0). Or, an index of a physical resource unit to which a logical resource unit is mapped may change with a predetermined pattern according to time to obtain a diversity gain in time domain and/or frequency domain.

In this resource unit structure, a resource pool may correspond to a set of resource units capable of being used by a UE intending to transmit a D2D signal.

Meanwhile, a resource pool can be classified into various types. First of all, the resource pool can be classified according to contents of a D2D signal transmitted in each resource pool. For example, the contents of the D2D signal can be classified into SA (scheduling assignment), a D2D data channel, a discovery channel, and a synchronization channel A separate resource pool can be configured for each of the contents.

The SA can also be referred to as a D2D control channel or a PSCCH (physical sidelink control channel). The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed.

The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool.

A resource pool for the discovery channel (or, PSDCH (physical sidelink discovery channel)) may correspond to a resource pool for a message that enables a neighboring UE to discover transmission UE transmitting information such as ID of the UE, and the like.

The synchronization channel can also be referred to as a sidelink synchronization signal or a PSBCH (physical sidelink broadcast channel). A resource pool for the synchronization channel may correspond to a resource pool for a signal/channel that a transmission UE transmits a synchronization signal and information related to synchronization to a reception UE and the reception UE matches time/frequency synchronization with the transmission UE.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like.

Meanwhile, V2X (vehicle to everything) communication has been discussed in association with D2D communication. The V2X may include V2V between vehicle UEs, V2P between a vehicle and another type of UE, and V2I (vehicle to infrastructure) between a vehicle and a roadside unit (RSU).

Figure 8:
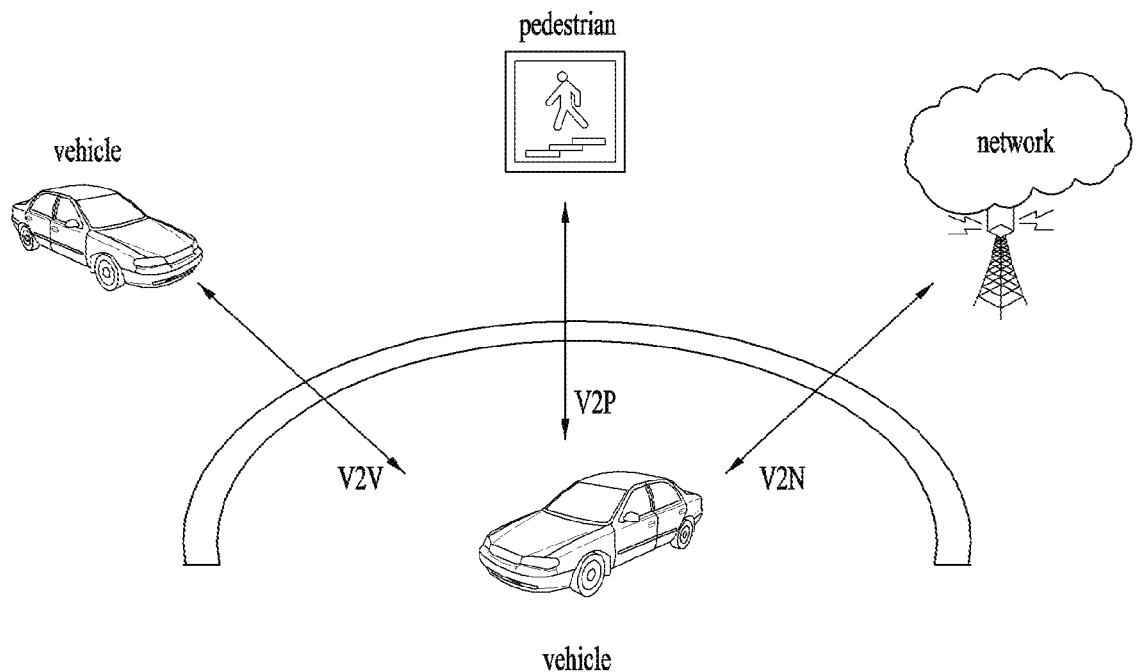
FIG. 8 is a diagram illustrating and example of V2X (vehicle to everything) communication environment.

FIG. 8 is a diagram illustrating V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby. Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB in E-UTRAN.

Meanwhile, when RA (resource allocation) is performed to select a resource to be used from a resource pool, the RA can be classified into centralized resource allocation and distributed resource allocation. In case of the centralized resource allocation, a specific entity such as an eNB or the like determines a transmission resource of a UE. In case of the distributed resource allocation, a UE autonomously determines a resource to be used by the UE. In particular, if at least a part of UEs performs the distributed resource allocation, since a plurality of UEs use the same resource, a resource collision occurs and the UEs may interfere with each other. Hence, it is necessary to have an appropriate solution for the resource collision.

In the following, a method of mitigating the resource collision problem is described. In particular, a method of solving the resource collision problem by forwarding information on a resource to be used in the future (hereinafter, future resource) between UEs is mainly explained.

Figure 9:
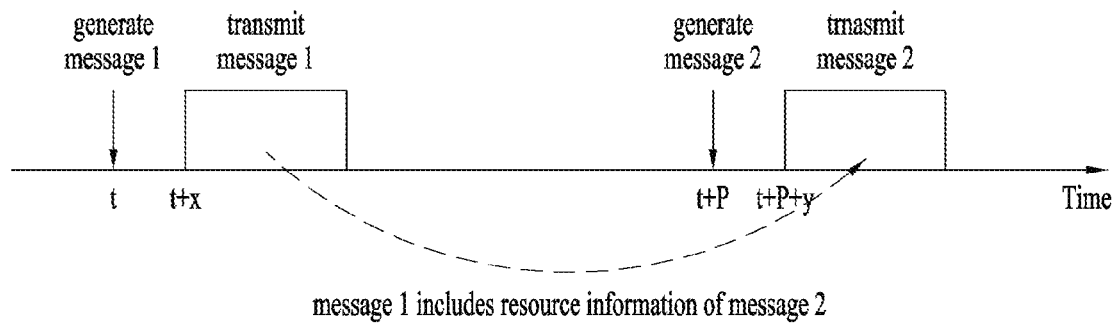
FIG. 9 is a diagram illustrating an example of an operation that a UE transmits information on a future resource by including the information in a D2D message.

FIG. 9 is a diagram illustrating an example of an operation that a UE transmits information on a future resource by including the information in a D2D message.

Referring to FIG. 9, a UE transmits a D2D message at specific timing. In this case, the UE can include information on time and/or frequency position of a resource to be used in the future in the D2D message.

For example, as shown in FIG. 9, when a UE transmits a D2D message which is generated with a certain period P, the UE may start to transmit a message 1 generated at timing t. In this case, the message 1 can include a fact that a message 2, which is to be generated at a next period, is going to be transmitted at timing t+P+y using a specific frequency resource. By doing so, the UE can inform a different UE of information on a future resource. In this case, time x or time y corresponds to delay time between message generation and actual transmission. In general, a message generation period P may have a value equal to or greater than 100 ms. The information on the future resource can be transmitted via such a separate control channel as SA (scheduling assignment). Or, the information can be transmitted in a manner of being included in a data channel (e.g., a partial field of MAC header).

As a simple example for a UE to determine a future resource, once the UE selects a resource, the UE can maintain the resource in a next transmission. In particular, in FIG. 9, a resource used at the timing t+x may be identical to a resource used at the timing t+P+y. In this case, a future resource can be simply designated in a manner that a transmission of a previous period (e.g., transmission of the message 1) indicates whether or not the same resource is used for a transmission of a next period (e.g., transmission of a message 2). More generally, once a UE selects a resource, the UE can continuously use the resource for a prescribed count. In other word, once the UE selects a resource, the UE continuously uses the resource until a resource is reselected.

Meanwhile, as mentioned in the foregoing description, if the UE forwards the information on the future resource to a different UE, since the different UE is able to know a position at which transmission is to be performed, it may also be able to prevent a resource collision in a next transmission. Yet, the information forwarding may be less effective in actual D2D communication environment. For example, if an information forwarding UE moves fast, since an interval between UEs increases in a next period (e.g., the timing at which the message 2 is transmitted in FIG. 9), although it is not necessary for the UEs to perform an operation of avoiding a resource collision, the information is unnecessarily utilized (i.e., unnecessary resource collision avoidance), thereby reducing resource utilization.

Figure 10:
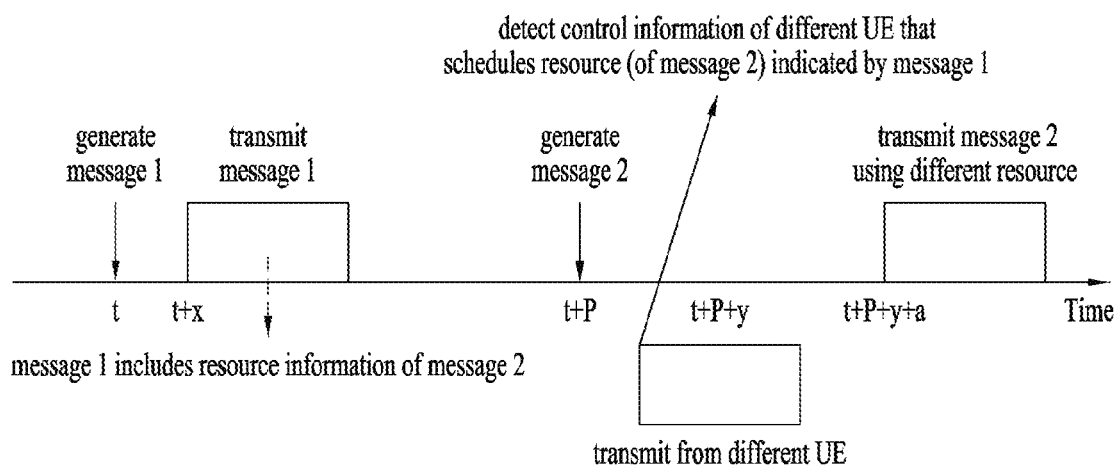
FIG. 10 is a diagram illustrating an example of an operation that a UE reselects a future resource.

Or, as mentioned in FIG. 10, although a specific UE designates a future resource, the UE may use a different resource at corresponding timing. In this case, it is not necessary for a UE, which has received information on the future resource, to perform resource avoidance according to the information.

FIG. 10 is a diagram illustrating an example of an operation that a UE reselects a future resource.

Referring to FIG. 10, although a UE designates a specific frequency resource from the timing t+P+y as a future resource (i.e., a transmission resource of a message 2) via a message 1, the UE reselects a future resource by identifying a resource collision collided with a transmission resource of a different UE based on information on the future resource. Specifically, the UE reads scheduling information of the different UE (in this case, the scheduling information is different from the information on the future resource in the aspect that the scheduling information corresponds to resource allocation information on a data which is transmitted at the timing identical to the timing of the scheduling information or timing appearing after several ms) and can determine that the transmission resource of the different UE is collided with the future resource designated by the UE.

In this case, as shown in FIG. 10, since the UE uses a different resource rather than the previously designated future resource, it is necessary for the UE, which has receive the information on the future resource, to reflect the collision possibility and appropriately (flexibly) utilize the information on the future resource. In FIG. 10, the UE does not maintain the future resource at the timing t+P+y and selects a new resource (a resource from the timing t+P+y+a). In particular, it can be regarded as the UE has performed resource reselection. In particular, the UE reads the resource allocation information of the different UE, identifies a collision of the future resource of the UE, and triggers resource reselection.

The present invention proposes various operations of UEs capable of more efficiently forwarding the information on the future resource and utilizing the forwarded future resource.

First of all, an exemplary operation of a UE designating a future resource is described in the following.

When a UE intends to designate a future resource, if it is highly probable for the UE to use the future resource as it is, the UE designates the future resource. Otherwise, the UE may not designate the future resource. It is highly probable for the UE to use the future resource as it is in the following cases.

As a first case, in case of transmitting data of a high priority (e.g., transmission is performed with short time delay, etc.), the UE can determine a transmission resource of the UE without reading resource allocation information of a different UE. This is aiming at reducing time delay consumed for reading the resource allocation information of the different UE. Since the data of the high priority is transmitted after a future resource is determined, there is no or relatively less reason for changing the future resource according to resource information of the different UE. Hence, an operation of designating the future resource is used.

As a second case, when a UE receives a resource to be used by the UE for prescribed time from a network entity such as an eNB and the like via the aforementioned centralized resource allocation, if there is no additional allocation, since the UE continuously uses the resource, the future resource designation operation is performed.

If the UE performs an operation of designating future resource information except the aforementioned operations, it is preferable to distinguish the operation from a case that it is highly probable for the UE to use a future resource as it is. For the distinction, information on whether or not the future resource information is practically valid can be additionally included. For example, information on whether or not a case corresponds to the aforementioned cases can be included.

As a specific example of the future resource information, a time position and a frequency position of a future resource can be included in the future resource information. In particular, although a message is periodically generated, since a size of the message may vary, it is preferable to include size information of a time resource and a frequency resource in the future resource information. If a control channel (e.g., SA) for scheduling transmission of a specific message is always transmitted, a different UE can obtain resource information of a data channel through the control channel Hence, the future resource information may have a form of designating a resource position of a control channel to be used in the future.

Meanwhile, as mentioned in the foregoing description, whether or not the UE, which has forwarded the future resource information, actually uses the future resource is not clear. If the aforementioned case that it is highly probable for the UE to use the future resource is excluded, whether or not the UE uses the future resource becomes more ambiguous. Hence, when the UE receives the future resource information from a specific UE, it is necessary for the UE to appropriately use the future resource information to prevent a side effect of excessively reducing resource use.

In the following, an operation of a UE, which has received future resource information, to reduce the side effect is explained.

If the UE receives the future resource information, the UE regards that there is no future resource information on a data having a priority lower than a priority of a data to be transmitted by the UE and may use a corresponding resource. In particular, when the UE receives the future resource information, if the UE receives future resource information on a data having a priority lower than a priority of a data to be transmitted by the UE, although the UE identifies a resource collision, the UE can use a corresponding resource without performing resource reselection.

According to partial embodiments, when the UE receives future resource information, the UE may avoid a resource designated as a future resource using a best effort scheme. For example, if the UE determines that a different resource is sufficiently empty at the timing identical or adjacent to the timing of a future resource of the different UE, the UE may not select a resource, which is designated as the future resource of the different UE, as a transmission resource. Yet, if it is determined as the number of different empty resources is equal to or less than a prescribed level, the UE may select the resource designated as a future resource as a transmission resource. Of course, although it is able to select the resource designated as the future resource of the different UE, the UE may select a resource which is not designated as the future resource of the different UE according to a final operation. This may indicate that there is no distinction between the resource designated as the future resource of the different UE and the resource which is not designated as the future resource of the different UE.

A similar operation can be implemented in a manner of being controlled according to an overall load status. In particular, when the UE receives the future resource information, if the UE determines that a load is low, the UE determines that there are many empty resources (resources not designated as a future resource of the different UE) and selects a resource by avoiding a designated resource. On the contrary, if the UE determines that a load is high, the UE determines that the number of empty resources is less. In this case, the UE may select a resource, which is designated as a future resource of the different UE, as a transmission resource. As an exemplary method of measuring a load status, the load status can be determined according to a level of a ratio of resources at which energy of a prescribed level is measured.

Meanwhile, the UE does not select a resource of which reception power is high from among the resources designated as the future resources of the different UE. On the contrary, the UE can select a resource of which the reception power is low as a transmission resource. Since interference between a future resource of a different UE far from the UE and a transmission resource of the UE is relatively less, overlapped resource use is permitted. The reception power can be directly measured at the resource designated as the future resource of the different UE or can be calculated from reception power of a control channel of the different UE. The reception power is anticipated in a data resource. As a detail example of the direct measurement, in order to perform the direct measurement, it may use all energies measured at the future resource of the different UE. Or, it may use reception power of a DM-RS only to be used by the different UE in the future resource.

According to the aforementioned principle, when it is not highly probable that a future resource is to be used as it is, it may use future resource information to designate a resource which has a relatively high probability of being used in the future only. In particular, a future resource may correspond to a resource to be preferentially considered when resource selection is internally performed in a corresponding UE. Hence, it may be able to designate a plurality of future resources. If at least one of resources designated as future resources is available, a UE uses the designated resource. Otherwise, the UE can be configured to use a resource rather than the resource designated as the future resource.

The abovementioned operations can be used in a manner of being combined. For example, when a UE receives future resource information, an operation of determining whether to select a future resource of a different UE according to the number of empty resource or a load status can be combined with an operation of determining whether to select a resource designated as a future resource of the different UE according to reception power of the resource.

For example, if the number of empty resources is many or a load is low, since a reception power reference for a future resource of a different UE is configured to be low, the UE, which has received the future resource information, may not select the future resource of the different UE, which shows relatively low reception power, to protect the future resource of the different UE. On the contrary, if the number of empty resources is less or a load is high, since the reception power reference for the future resource of the different UE is configured to be high, it may be able to make the UE, which has received the future resource information, select the future resource of the different UE, which shows relatively high reception power. In this case, if the UE, which has received the future resource information, selects all or a part of resources designated as the future resource of the different UE and configures the selected resources as unavailable resources, a set of the resources can be defined as an unavailable resource set. And, a set of resources not belonging to the unavailable resource set can be defined as a candidate resource set. A resource can be practically selected from among resources belonging to the candidate resource set only.

In the following, an operation of a UE utilizing future resource information according to a priority is explained in more detail.

As mentioned earlier in FIG. 10, if a UE reads future resource information of a different UE and detects a possibility of collision with a transmission of the UE, the UE can trigger a resource reselection. Yet, as mentioned in the foregoing description, if the future resource information of the different UE schedules a data having a priority lower than a priority of a data to be transmitted by the UE, the UE ignores resource information of the different UE and does not trigger a resource reselection to consistently perform the transmission of the UE. As a different meaning, if the UE obtains scheduling information of the different UE collided with the transmission of the UE, the UE triggers the resource reselection only when the different UE schedules a data of a priority equal to or higher than a priority of the transmission of the UE. In this case, although it is able to obtain the resource information of the different UE from the future resource information of the different UE, the resource information can also be obtained from direct resource allocation information of the different UE.

In particular, if a resource reselection triggering operation is performed as mentioned in the foregoing description, it may be able to make a data of a higher priority consistently occupy a resource. In particular, the resource reselection triggering operation may prevent a resource collision not only with the UE, which have selected a collision resource, but also with the different UE. In particular, if the resource reselection triggering operation is combined with an operation for a UE intending to transmit a data of a low priority to detect a resource collision, perform a resource reselection, and avoid the resource collision, it may be able to more efficiently protect a transmission of a data of a high priority.

Meanwhile, if a UE operates while scheduling of a low priority is unconditionally ignored, a resource collision may unnecessarily occur even in a situation capable of avoiding the resource collision. Hence, the aforementioned operation of ignoring the scheduling of a low priority (i.e., an operation of not triggering a resource reselection despite a resource collision is detected) can be restrictively applied to a specific situation only.

For example, although scheduling is performed with a low priority, if reception power of the scheduling is measured with a value equal to or greater than a certain level, since the scheduling may act as strong interference to a transmission of a UE when a resource collision occurs, the UE may trigger a resource reselection.

As a different example, when a low load is applied to an entire radio channel, for example, when an average energy level sensed on a radio channel is equal to or less than a prescribed level or a ratio of resources actually used for a transmission of a different UE to radio channel resources is equal to or less than a prescribed level, although scheduling is performed with a low priority, since there are sufficient resources for avoiding the scheduling, it may trigger a resource reselection when a resource collision is detected.

Or, when a UE intending to transmit a signal of a priority A reads scheduling of a priority B different from the priority A and detects a resource collision, in order to control a priority right between priorities, a network can determine whether to trigger a resource reselection according to a combination of the priority A and the priority B. For example, when a data having the priority A is transmitted, if a data transmitted in a collided resource has the priority B, the UE triggers a resource reselection. If the data has a priority C, it may be able to configure the UE not to trigger the resource reselection.

The aforementioned embodiments can be combined with each other. Various reference values for determining whether to trigger the resource reselection (e.g., a reference value applied to scheduling reception power of a different UE, a referenced value applied to an average energy level sensed on a radio channel, a reference value applied to a ratio of resources actually used for a transmission of a different UE to radio channel resources, and the like) can be configured by a network. If the configuration is configured by an extreme value (e.g., 0 or infinite amount), it may be able to determine whether or not a corresponding condition influences on whether to trigger the resource reselection. And, the configuration can be differently configured according to a combination of priorities (i.e., a combination between a priority of a data to be transmitted by a UE and a priority of a data of a different UE identified by reading scheduling of the different UE).

The aforementioned operations are not restricted to whether or not a resource reselection is triggered. The operations can be applied to a D2D resource selection operation of a normal UE. For example, when a UE selects a new resource, the UE can determine whether to select a resource collided with a resource, which is designated as a resource of a specific UE, as a transmission resource based on priority information, a load status of a channel, or a size of reception power. Specifically, when a UE intends to select a resource to transmit a data of a high priority and it is determined as a load status of a channel is high, if power equal to or less than a prescribed level is measured at a resource designated as a resource for transmitting a data of a low priority of a different UE, the UE permits to select a resource collided with the resource. On the contrary, when it is determined as a load status of a channel is low, if power of a similar level is measured at a resource designated as a resource for transmitting a data of a low priority of a different UE, it may prohibit the UE from selecting a resource collided with the resource.

In particular, if a specific UE receives future resource information, the specific UE can exclude a resource of which reception power is greater than a specific threshold among future resources of a different UE from the aforementioned candidate resource set. In other word, the specific UE can configure the resource of which reception power is greater than a specific threshold among future resources of a different UE as an unavailable resource set. According to partial embodiments, the specific threshold can be determined based on a priority of a data to be transmitted in a future resource of a different UE and a priority of a data to be transmitted by the specific UE.

Meanwhile, if the number of subframes included in the candidate resource set is less than a specific value, a value of the specific threshold can be increased to a higher value (e.g., a value increased as much as 3 dB). In this case, the specific UE can determine the candidate resource set again on the basis of the increased specific threshold value. In particular, the specific UE can exclude a resource of which reception power is greater than the increased specific threshold from the candidate resource set. In particular, if the number of empty resources is less or a load is high, a reception power reference for a future resource of a different UE is configured to be high.

In the following, an operation of selecting a D2D resource selected by a UE is explained with reference to FIG. 11.

Figure 11:
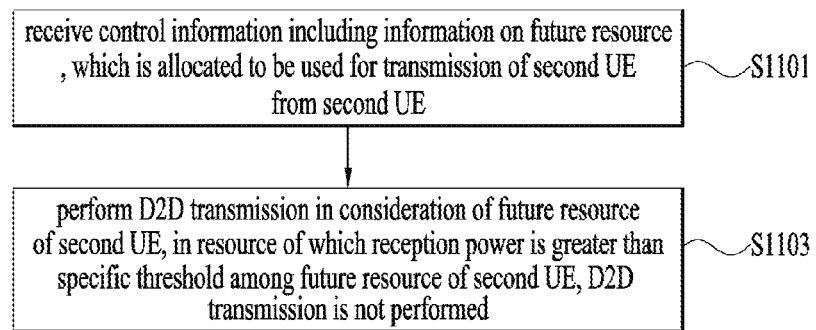
FIG. 11 is a flowchart illustrating a D2D resource selection operation according to one embodiment of the present invention.

FIG. 11 is a flowchart illustrating a D2D resource selection operation according to one embodiment of the present invention.

Referring to FIG. 11, a UE (first UE) intending to perform D2D transmission receives control information including information on a future resource of a different UE (second UE) allocated to perform transmission of the second UE from the second UE [S1101] and can perform the D2D transmission in consideration of the future resource of the second UE included in the control information [S1103].

In particular, the first UE receives the control information of the second UE, selects a resource not collided with the future resource of the second UE using the control information, and performs the D2D transmission. According to the present embodiment, it is able to select a resource of D2D transmission in consideration of reception power of a future resource of the second UE instead of avoiding a resource collision with the future resource of the second UE.

Specifically, the first UE does not perform D2D transmission in a resource of which reception power is greater than a specific threshold among future resources of the second UE. Although the second UE designates a resource as a future resource, if the resource corresponds to a resource oh which reception power is less than the specific threshold, the first UE can use the resource for D2D transmission. Information on the specific threshold can be received from a base station.

Yet, in some embodiments, if the number of resources usable for the D2D transmission is smaller than a specific value, although a future resource of which reception power is greater than a specific threshold of the second UE is collided with a resource to be used for the D2D transmission, the D2D transmission can be performed using the future resource.

Meanwhile, the specific threshold can be determined based on the number of resources capable of being used by the first UE for the D2D transmission. For example, if the number of resources usable for the D2D transmission is smaller than a specific value, the specific threshold can be configured to have a bigger value. This is because, as mentioned in the foregoing description, if the number of available resources is less, a range of resources capable of being selected by the first UE is relatively widened by increasing the specific threshold.

In some embodiments, reception power of a future resource of the second UE may correspond to a value directly measured from the future resource of the second UE or a value anticipated from reception power of the control information. And, the reception power of the future resource of the second UE may correspond to reception power of all future resources of the second UE or reception power of a DM-RS among the future resources of the second UE.

In some embodiments, control information of the second UE further includes information on a priority of a data to be transmitted by the second UE and the specific threshold can be determined based on the priority of the data to be transmitted by the second UE and a priority of a data to be transmitted by the first UE. In particular, a value of the specific threshold may vary depending on the priority of the data to be transmitted by the second UE and the priority of the data to be transmitted by the first UE.

According to the present invention, a specific UE performs an operation of avoiding a resource collision between a resource for performing D2D transmission and a future resource of a different UE in consideration of reception power of the future resource, a priority of transmission data, and the like. By doing so, it may be able to reduce unnecessary resource collision avoidance, thereby increasing resource utilization in D2D communication.

Figure 12:
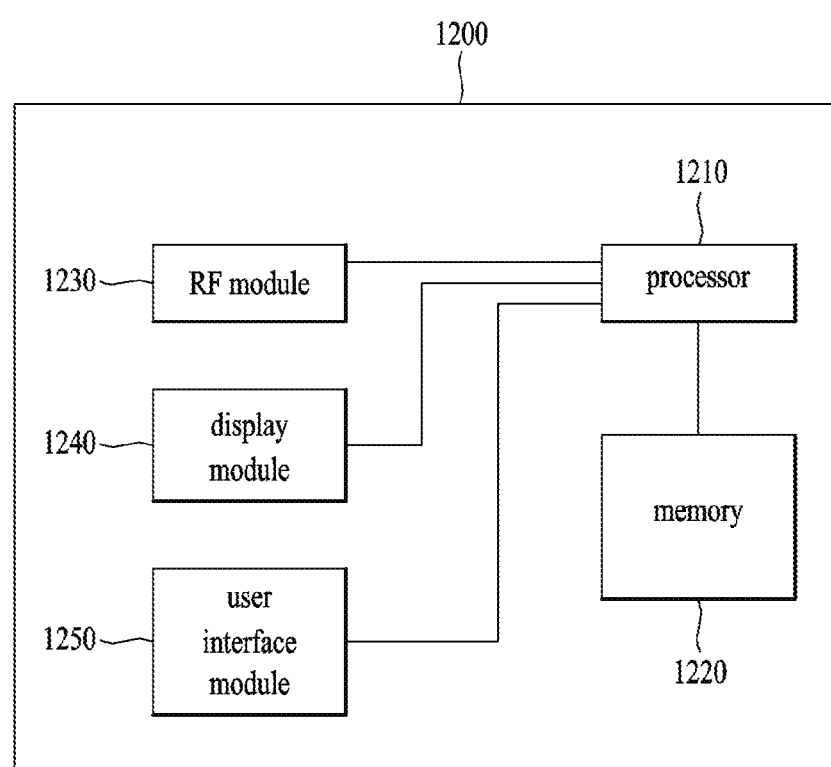
FIG. 12 is a block diagram for a communication device according to one embodiment of the present invention.

FIG. 12 is a block diagram for a communication device according to one embodiment of the present invention.

Referring to FIG. 12, a communication apparatus 1200 includes a processor 1210, a memory 1220, a Radio Frequency (RF) module 1230, a display module 1240 and a user interface module 1250.

The communication apparatus 1200 is shown for convenience of description and some modules thereof may be omitted. In addition, the communication apparatus 1200 may further include necessary modules. In addition, some modules of the communication apparatus 1200 may be subdivided. The processor 1210 is configured to perform an operation of the embodiment of the present invention described with reference to the drawings. For a detailed description of the operation of the processor 1210, reference may be made to the description associated with FIGS. 1 to 11.

The memory 1220 is connected to the processor 1210 so as to store an operating system, an application, program code, data and the like. The RF module 1230 is connected to the processor 1210 so as to perform a function for converting a baseband signal into a radio signal or converting a radio signal into a baseband signal. The RF module 1230 performs analog conversion, amplification, filtering and frequency up-conversion or inverse processes thereof. The display module 1240 is connected to the processor 1210 so as to display a variety of information. As the display module 1240, although not limited thereto, a well-known device such as a Liquid Crystal Display (LCD), a Light Emitting Diode (LED), or an Organic Light Emitting Diode (OLED) may be used. The user interface module 1250 is connected to the processor 1210 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'enhanced Node B (eNode B or eNB)', 'access point', etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although a method of allocating a resource for performing direct communication between UEs in a wireless communication system and an apparatus therefor are described with reference to examples applied to 3GPP LTE system, it may be applicable to various kinds of wireless communication systems as well as the 3GPP LTE system.

What is claimed is:

1. A method for performing D2D (device-to-device) communication, by a first user equipment UE, in a wireless communication system, the method comprising:
selecting, from a predetermined resource pool, candidate resources for transmission of a D2D signal configured with a first priority;
obtaining, from a second UE, information on a reserved resource scheduled to be used for transmission of data by the second UE and information on a second priority related to the data,
determining whether to exclude the reserved resource from the candidate resources based on a specific threshold; and
performing transmission of the D2D signal based on the determination,
wherein the reserved resource is excluded from the candidate resources based on a detection of a reception strength greater than or equal to the specific threshold value in the reserved resource,
wherein the reception strength is a reception power of a demodulation reference signal (DM-RS) directly measured in the reserved resource of the second UE, and
wherein the specific threshold, which is a reference value for determining whether to exclude the reserved resource, is predetermined based on the first priority and the second priority.

2. The method of claim 1, wherein the specific threshold is received by higher layer signaling of a base station.

3. The method of claim 1, wherein the candidate resources include the reserved resource when the reception power of the reserved resource is less than the specific threshold.

4. The method of claim 1, wherein the reserved resource is excluded from the candidate resources when the reserved resource has a reception power greater than the specific threshold value and when a number of the determined transmission resources is greater than a specific value.

5. The method of claim 1, wherein the second priority is different from the first priority.

6. A first user equipment (UE) performing D2D (device-to-device) communication in a wireless communication system, the first UE comprising:
an RF (radio frequency) unit including a transceiver; and
a processor,
wherein the processor configured to:
select, from a predetermined resource pool, candidate resources for transmission of a D2D signal configured with a first priority,
control the RF unit to obtain, from a second UE, information on a reserved resource scheduled to be used for transmission of data by the second UE and information on a second priority related to the data,
determine whether to exclude the reserved resource from the candidate resources based on a specific threshold,
control the RF unit to perform transmission of the D2D signal based on the determination
wherein the reserved resource is excluded from the candidate resources based on a detection of a reception strength greater than or equal to the specific threshold value in the reserved resource,
wherein the reception strength is a reception power of a demodulation reference signal (DM-RS) directly measured in the reserved resource of the second UE, and
wherein the specific threshold, which is a reference value for determining whether to exclude the reserved resource, is predetermined based on the first priority and the second priority.

7. The first UE of claim 6, wherein the specific threshold is received by higher layer signaling of a base station.

8. The first UE of claim 6, wherein the candidate resources include the reserved resource when the reception power of the reserved resource is less than the specific threshold.

9. The first UE of claim 6, wherein the reserved resource is excluded from the candidate resources when the reserved resource has a reception power greater than the specific threshold value and when a number of the determined transmission resources is greater than a specific value.

10. The first UE of claim 6, wherein the second priority is different from the first priority.

* * * * *